US006169045B1

(12) United States Patent
Pike et al.

(10) Patent No.: US 6,169,045 B1
(45) Date of Patent: *Jan. 2, 2001

(54) NONWOVEN FILTER MEDIA

(75) Inventors: Richard Daniel Pike, Norcross; John Joseph Lassig, Lawrenceville; Peter Wyndham Shipp, Jr., Woodstock; Barbara Jean Williams, Powder Springs, all of GA (US)

(73) Assignee: Kimberly-Clark Worldwide, Inc., Neenah, WI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/745,551

(22) Filed: Nov. 12, 1996

Related U.S. Application Data (63) Continuation of application No. 08/153,466, filed on Nov. 16, 1993, now abandoned.

(51) Int. Cl.[7] .................................................. D04H 1/00
(52) U.S. Cl. ...................... 442/352; 442/353; 442/361; 442/364
(58) Field of Search ................................... 428/373, 374, 428/395; 442/327, 352, 353, 359, 364, 401, 414; 210/640, 654, 767, 500.1, 507, 508

(56) References Cited

U.S. PATENT DOCUMENTS

| Re. 30,955 | 6/1982 | Stanistreet ........................ 156/308.2 |
|---|---|---|
| 3,589,956 | 6/1971 | Kranz et al. ........................ 156/62.4 |
| 3,595,731 | 7/1971 | Davies et al. ........................ 161/150 |
| 3,802,817 | 4/1974 | Matsuki et al. ........................ 425/66 |

(List continued on next page.)

FOREIGN PATENT DOCUMENTS

| 0395336 | 10/1990 | (EP) | ................................ D01F 8/06 |
|---|---|---|---|
| 2307071 | 11/1976 | (FR) | ................................ D04H 1/50 |
| 1543905 | 1/1978 | (GB) . | |
| 2153867 | 2/1985 | (GB) . | |
| 93/01334 | 1/1993 | (WO) . | |
| 9321371 | 10/1993 | (WO) | ............................ D04H 3/16 |

OTHER PUBLICATIONS

Wells Shoemaker, Filterex Associates Shippensburg, PA, "Nonwoven Technology in Filter Media", Oct. 1984: 52–56.

Wells Shoemaker, Filtration News Spotlite—Filter Media—Part 1, "Nonwoven Filter Media", May/Jun. 1986: FN/2–7 and Part 2, Jul./Aug. 1986: FN/18–21.

John Martin/Bryan Thomas, "Wet–Laid Technology in Nonwoven Filtration", Sep./Oct. 1989: FN/32–33.

Lydall Manning Nonwovens, "Coolant Filter Media Reduces Waste Cuts Disposal Costs", May/Jun. 1993:17.

Keith Harrington, "Understanding Fibrous Particle Air Filtration and How That Can Save You Money", Sep./Oct. 1992: 40–42.

(List continued on next page.)

Primary Examiner—William Krynski
Assistant Examiner—J. M. Gray
(74) Attorney, Agent, or Firm—Douglas H. Tulley, Jr.; Michael U. Lee

(57) ABSTRACT

There is provided in accordance with the present invention a lofty filter medium for filtering fluid-borne particles, which comprises a nonwoven fiber web of crimped fibers selected from the group consisting of spunbond fibers and staple fibers, wherein the filter medium has a density between about 0.005 g/cm$^3$ and about 0.1 g/cm$^3$. The lofty filter medium is highly suitable for fluid-borne particle filtration applications, such as filtration media for transmission fluids, hydraulic fluids, swimming pool water, coolant oil or cutting fluid for metalworking, metal forming and metal rolling, air-borne particle filtration and the like.

21 Claims, 2 Drawing Sheets

U.S. PATENT DOCUMENTS

| | | | |
|---|---|---|---|
| 4,068,036 | 1/1978 | Stanistreet | 428/296 |
| 4,118,531 | 10/1978 | Hauser | 428/224 |
| 4,211,661 | 7/1980 | Perry | 210/491 |
| 4,211,819 * | 7/1980 | Kunimune et al. | 428/374 |
| 4,292,365 | 9/1981 | Kane et al. | 428/288 |
| 4,323,374 | 4/1982 | Shinagawa et al. | 55/132 |
| 4,431,545 | 2/1984 | Pall et al. | 210/641 |
| 4,546,040 | 10/1985 | Knotek et al. | 428/370 |
| 4,547,420 | 10/1985 | Krueger et al. | 428/229 |
| 4,551,378 | 11/1985 | Carey, Jr. | 428/198 |
| 4,589,408 | 5/1986 | Singer | 128/132 |
| 4,689,058 | 8/1987 | Vogt et al. | 55/279 |
| 4,714,647 | 12/1987 | Shipp, Jr. et al. | 428/212 |
| 4,729,371 | 3/1988 | Krueger et al. | 128/206.19 |
| 4,883,707 * | 11/1989 | Newkirk | 428/296 |
| 4,948,515 | 8/1990 | Okumura et al. | 210/748 |
| 4,948,639 | 8/1990 | Brooker et al. | 428/35.2 |
| 5,063,945 | 11/1991 | Sugihara et al. | 131/332 |
| 5,106,552 | 4/1992 | Goi et al. | 264/103 |
| 5,141,699 | 8/1992 | Meyer et al. | 264/518 |
| 5,176,952 | 1/1993 | Joseph et al. | 428/286 |
| 5,188,885 | 2/1993 | Timmons et al. | 428/198 |
| 5,232,770 | 8/1993 | Joseph | 428/284 |
| 5,270,107 * | 12/1993 | Gessner | 428/296 |
| 5,336,552 * | 8/1994 | Strack et al. | 428/224 |
| 5,382,400 | 1/1995 | Pike et al. | 264/168 |
| 5,418,045 | 5/1995 | Pike et al. | 428/198 |
| 5,482,772 | 1/1996 | Strack et al. | 428/357 |
| 5,597,645 * | 1/1997 | Pike et al. | 96/99 |
| 5,609,947 | 3/1997 | Kamei et al. | 428/212 |
| 5,656,368 * | 8/1997 | Braun et al. | 428/141 |
| 5,667,562 * | 9/1997 | Midkiff | 96/15 |
| 5,753,343 * | 5/1998 | Braun et al. | 428/141 |
| 5,763,078 * | 6/1998 | Braun et al. | 428/365 |
| 5,817,584 * | 10/1998 | Singer et al. | 442/345 |
| 5,855,784 * | 1/1999 | Pike et al. | 210/505 |
| 5,873,968 * | 2/1999 | Pike et al. | 156/73.2 |
| 5,935,883 * | 8/1999 | Pike | 442/340 |

OTHER PUBLICATIONS

Jim Joseph, Joseph Marketing, Inc., "Basic Review of Coolant Filtration", Jul./Aug. 1990: 12–15.

Philip Z. Chrys, "Selecting Filter Media For Coolant Filtration", May/Jun. 1991: 38–41.

Abstract for JP 06–073613 Mar. 1994.

* cited by examiner

NONWOVEN FILTER MEDIA

This application is a continuation of application Ser. No. 08/153,466 entitled "NONWOVEN FILTER MEDIA" and filed in the U.S. Patent and Trademark Office on Nov. 16, 1993 now abandoned. The entirety of this Application is hereby incorporated by reference.

This invention is related to filter media, particularly to media for filters made from nonwoven fiber webs.

Various particulate filtering media are available in the art, including media for air filters, water filters, hydraulic and oil filters, coolant filters, chemical filters and the like, and they are fabricated from diverse materials, such as glass fibers, asbestos fibers, synthetic polymer fibers, e.g, polyolefins, polyamides, polyesters and the like, and natural fibers, such as wood pulps and the like.

A filter medium not only has to provide a high filter efficiency, i.e., prevent fine particles from passing through, but also needs to provide a high throughput, i.e., maintain the pressure drop across the filter medium as low as possible over the useful life. In addition, the useful service life of a filter medium must not be too short as to require frequent cleaning or replacement. However, these performance requirements tend to be inversely correlated. For example, a high efficiency filter medium tends to create a high pressure drop, severely restricting its throughput capability and service life.

The use of nonwoven fiber webs or fabrics is known in the filtration art, and such nonwoven webs include meltblown fiber webs and spunbond fiber webs. Filter media fabricated from meltblown fiber webs tend to provide high filtration efficiency because of the fine fiber size and the conformability of meltblown fibers that causes the fibers to come together as a dense, fine-pored web. However, meltblown fiber webs do not provide sufficient physical properties, including tensile, tear and burst properties, and the service life of the filters made from the webs is not sufficiently long enough for certain applications. Compared with meltblown fiber webs, spunbond fiber webs contain coarse, highly continuous fibers or filaments having strong physical properties. Typically, spunbond fibers have a higher degree of molecular orientation than that of meltblown fibers, and it is believed that the stronger physical properties of spunbond fibers and webs made therefrom are attributable to the higher molecular orientation of spunbond fibers. However, spunbond fibers, unlike meltblown fibers, do not autogenously adhere to each other and the webs need to be bonded in a separate bonding process to impart physical coherency and integrity. Conventional bonding processes, such as calender bonding, which compact the webs as well as apply discrete bonded regions throughout the webs, reduce the effective filtration area and service life of the spunbond webs.

As is known in the filtration art, one of the major determinants for filtration efficiency is the ability of a filter medium to mechanically entrap contaminants while maintaining an operationally sufficient flow rate. The loft or thickness of a filter medium promotes the mechanical entrapment of contaminants within its intersticial spaces or pores without impeding the flow of filtrate. Such filtration process is known in the art as "depth filtration." Unlike depth filtration media, flat "surface filtration" media, such as membrane filter media and meltblown fiber filter media, must accumulate contaminants on their surfaces, quickly plugging up all the available channels or pores and building up a high pressure drop across the filter media. There have been many attempts to produce filter media that exhibit combined depth filtration and high efficiency properties. One of such attempts is providing filter media having a laminated structure of at least two nonwoven fiber webs having different porosities. The laminate filter medium has a porosity gradient across its depth, which improves the filter efficiency and prevents premature plugging failure by entrapping large particulates before they can reach the smaller pores.

It would be desirable to provide highly efficient filter media that have a long service life as well as strong physical properties. Additionally, it would be desirable to provide a highly adaptable and flexible filter media forming process which can produce media of varying pore sizes and pore densities and of optimized filtration performances for filtrates with different particulate size distributions and/or different flow properties.

SUMMARY OF THE INVENTION

There is provided in accordance with the present invention a lofty filter medium for filtering fluid-borne particles, which comprises a nonwoven fiber web of crimped fibers selected from the group consisting of spunbond fibers and staple fibers, wherein the filter medium has a density between about 0.005 g/cm$^3$ and about 0.1 g/cm$^3$. There is also provided a more particularly suitable lofty nonwoven filter medium for filtering fluid-borne particles, comprising a fiber web of crimped bicomponent spunbond fibers, wherein the medium has a density between about 0.005 g/cm$^3$ and about 0.1 g/cm$^3$ and the spunbond fibers have an average diameter of from about 10 µm to about 50 µm. Additionally, the present invention provides a process for producing a lofty spunbond fiber filter web comprising the steps of melt spinning spunbond fibers; drawing the fibers; crimping the fibers; depositing the drawn, crimped fibers onto a forming surface to form a web; and bonding the web, wherein the web has a density between about 0.005 g/cm$^3$ and about 0.1 g/cm$^3$.

The lofty filter medium, which provides extended service life and high filter efficiencies, is highly suitable for fluid-borne particle filtration applications, such as filtration media for transmission fluids, hydraulic fluids, swimming pool water, coolant oil or cutting fluid for metalworking, metal forming and metal rolling, air-borne particle filtration and the like.

DETAILED DESCRIPTION OF THE INVENTION

The present invention provides a high performance filter medium. The filter medium, which exhibits strong physical properties and provides extended service life, is a lofty nonwoven fiber web that is highly porous. The lofty filter medium has a density between about 0.005 g/cm$^3$ and about 0.1 g/cm$^3$, preferably between about 0.01 g/cm$^3$ and about 0.09 g/cm$^3$, and more preferably between about 0.02 g/cm$^3$ and about 0.08 g/cm$^3$. The basis weight of the filter medium ranges from about 0.25 to about 15 ounce per square yard (osy), preferably from about 0.4 to about 14 osy, and more preferably from about 0.5 to about 13 osy.

Fibers suitable for the present invention filter medium include crimped spunbond fibers and crimped staple fibers, and these fibers can be monocomponent fibers or multicomponent conjugate fibers. Suitable spunbond fibers and staple fibers for the present invention have an average diameter of about 10 μm to about 50 μm. Of these crimped fibers, particularly suitable fibers are multicomponent conjugate fibers that contain two or more component polymers, and more particularly suitable fibers are multicomponent conjugate fibers containing polymers of different melting points. Preferably, the melting point difference between the highest melting polymer and the lowest melting polymer of the conjugate fibers should be at least about 5° C., more preferably about 30° C., so that the lowest melting polymer can be melted without affecting the chemical and physical integrities of the highest melting polymer.

Generally, staple fibers, including monocomponent and conjugate staple fibers, are carded using a conventional carding process, e.g., a woolen or cotton carding process, or air laid to form unbonded nonwoven fiber webs; and spunbond fibers are formed into unbonded spunbond fiber webs by directly depositing spun fibers onto a forming surface. The term spunbond fiber web refers to a nonwoven fiber web formed by extruding molten thermoplastic polymers as filaments or fibers from a plurality of relatively fine, usually circular, capillaries of a spinneret. The extruded filaments are then rapidly drawn by an eductive or other well-known drawing mechanism to impart molecular orientation and physical strength to the filaments, and deposited onto a forming surface in a highly random manner to form a nonwoven web having essentially a uniform density. In order to maintain the web uniformity and pore distribution, it is preferred that the staple fibers and spunbond fibers are crimped before they are formed into a web, although conjugate fibers can be crimped after the fibers are formed into a web. As is known in the art, monocomponent staple fibers and conjugate staple fibers can be mechanically crimped by passing fully formed fibers through, for example, a stuffer box or gear crimper, and conjugate staple fibers can be crimped by drawing or stretching fully formed fibers before the fibers are cut to staple lengths. Fibers may also be crimped during spinning. Crimps on monocomponent fibers and conjugate fibers, including spunbond and staple fibers, can be imparted through asymmetric cooling across the cross-section of the fibers, generating solidification gradients within the cross-section, which leads to the formation of crimps, particularly helical crimps. Crimps on conjugate fibers, including spunbond fibers and staple fibers, composed of two or more component polymers that have different crystallization and/or solidification properties can be crimped during the solidification stage of the fiber spinning process, during which the differences in the component polymers create crystallization and/or solidification gradients that cause crimps on the fibers. Further, the differences in crystallization and/or solidification properties, which make the component polymers of the formed fibers to have different heat shrinkages, can be utilized to impart or additionally impart crimps on the fully formed conjugate fibers. Upon exposure to an appropriate heat treatment, the component polymers, having different heat shrinkages, cause crimps on the fibers. Such activation of "latent crimp" can be directed after conjugate fibers are formed into a web, or, as will be discussed with regard to a particularly suitable embodiment of the present invention, on the fibers prior to the web formation. The activation of latent crimps on the fibers prior to the web formation is more desirable since this process produces more uniform and dimensionally stable webs.

The unbonded conjugate fiber webs, including conjugate staple fiber webs and conjugate spunbond webs, can be bonded using a conventional bonding process that does not significantly compact the webs. Such processes include through-air bonding, powder adhesive bonding, liquid adhesive bonding, ultrasonic bonding, needling and hydroentangling. These bonding processes are conventional and well known in the art. Among these bonding processes, through-air bonding processes are particularly suitable for the present invention since the bonding processes bond the conjugate fiber webs without applying any substantial compacting pressure and, thus, produce lofty, uncompacted filter media. Through-air bonding processes are further discussed below. Similarly, the nonwoven webs of monocomponent fibers, including staple fiber webs and spunbond fiber webs, can be bonded with the above-disclosed bonding processes other than through-air bonding processes. Through-air bonding processes are not particularly suitable for monocomponent fiber webs unless the processes are used in conjunction with powder adhesive bonding or fluid adhesive bonding processes since through-air bonding processes, which need to melt the web fibers to effect bonds, produce flattened webs having a non-uniform loft.

The particularly suitable filter medium of the present invention is through-air bonded nonwoven webs fabricated from crimped multicomponent conjugate fibers, and more particularly suitable conjugate fibers are spunbond conjugate fibers. For illustration purposes, the present invention hereinafter is directed to bicomponent spunbond conjugate fibers (hereinafter referred to as bicomponent fibers) and bicomponent fiber webs, and to a through-air bonding process although other spunbond or staple conjugate fibers of more than two polymers and other bonding processes can be utilized for the present invention, as discussed above.

In accordance with the present invention, the suitable bicomponent fibers have the low melting component polymer at least partially exposed to the surface along the entire length of the fibers. Suitable configurations for the bicomponent fibers include side-by-side configurations and sheath-core configurations, and suitable sheath-core configurations include eccentric sheath-core and concentric sheath-core configurations. Of these sheath-core configurations, eccentric sheath-core configurations are particularly useful since imparting crimps on eccentric sheath-core bicomponent fibers can be effected more easily. If a sheath-core configuration is employed, it is highly desired to have the low melting polymer form the sheath.

A wide variety of combinations of thermoplastic polymers known to form fibers and/or filaments can be employed to produce the conjugate fibers provided that the selected polymers have sufficiently different melting points and, preferably, different crystallization and/or solidification properties. The melting point differences between the selected polymers facilitate the through-air bonding process, and the differences in the crystallization and solidification properties promote fiber crimping, especially crimping through heat activation of latent crimps. Suitable polymers for the present invention include, but are not limited to, polyolefins, e.g., polyethylene, polypropylene, polybutylene and the like; polyamides, e.g., nylon 6, nylon 6/6, nylon 10, nylon 12 and the like; polyesters, e.g., polyethylene terephthalate, polybutylene terephthalate and the like; polycarbonate; polystyrene; thermoplastic elastomers; vinyl polymers; polyurethane; and blends and copolymers thereof. Particularly suitable polymers for the present invention are polyolefins, including polyethylene, e.g., linear low density polyethylene, low density polyethylene, medium density polyethylene, high density polyethylene and blends thereof; polypropylene; polybutylene; and copolymers as well as blends thereof. Additionally, the suitable fiber forming polymers may have thermoplastic elastomers blended therein. Of these suitable polymers, particularly suitable polymers for the high melting component include polypropylene and copolymers of polypropylene and ethylene, and particularly suitable polymers for the low melting component include polyethylenes, more particularly linear low density polyethylene and high density polyethylene. In addition, the low melting component may contain additives for enhancing the crimpability and/or lowering the bonding temperature of the fibers, and enhancing the abrasion resistance, strength and softness of the resulting webs. For example, the low melting polymer component may contain about 5 to about 20% by weight of a thermoplastic elastomer such as an ABA' block copolymer of styrene, ethylene-butylene and styrene. Such copolymers are commercially available and some of which are identified in U.S. Pat. No. 4,663,220 to Wisneski et al. An example of highly suitable elastomeric block copolymers is KRATON G-2740. Another group of suitable additive polymers is ethylene alkyl acrylate copolymers, such as ethylene butyl acrylate, ethylene methyl acrylate and ethylene ethyl acrylate, and the suitable amount to produce the desired properties is from about 2 wt % to about 50 wt %, based on the total weight of the low melting polymer component. Yet other suitable additive polymers include polybutylene copolymers and ethylene-propylene copolymers.

The bicomponent fibers have from about 20% to about 80%, preferably from about 40% to about 60%, by weight of the low melting polymer and from about 80% to about 20%, preferably about 60% to about 40%, by weight of the high melting polymer.

Figure 1:
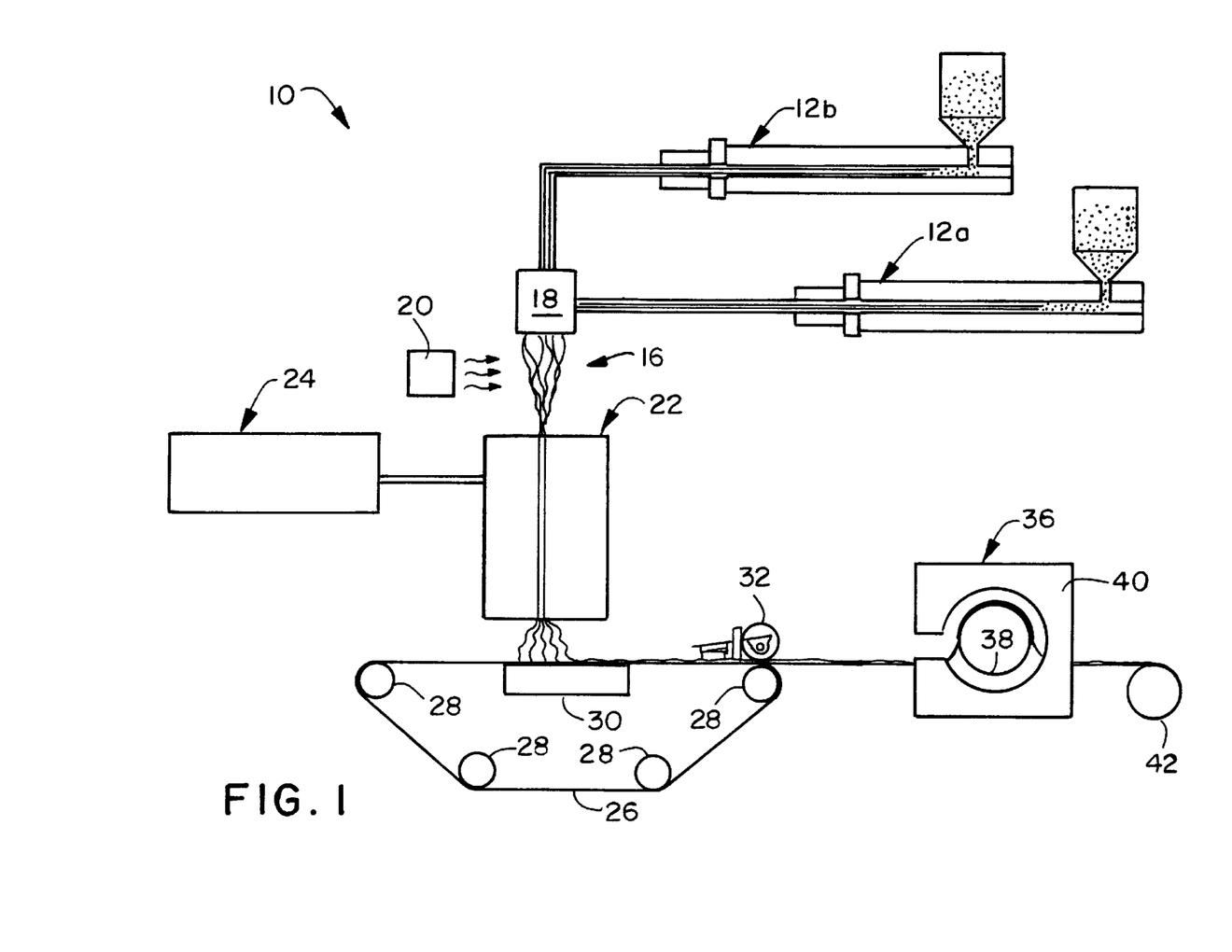
FIG. 1 is a schematic diagram of a bicomponent spunbond web forming process which is used to produce a filter medium of the present invention.

Turning to FIG. 1, there is illustrated a particularly suitable process 10 for producing a highly suitable spunbond fiber web for the present filter. The process line 10 includes a pair of extruders 12a and 12b for separately supplying extruded polymer components, a high melting polymer and a low melting polymer, to a bicomponent spinneret 18. Spinnerets for producing bicomponent fibers are well known in the art and thus are not described herein. In general, the spinneret 18 includes a housing containing a spin pack which includes a plurality of plates having a pattern of openings arranged to create flow paths for directing the high melting and low melting polymers to each fiber-forming opening in the spinneret. The spinneret 18 has openings arranged in one or more rows, and the openings form a downwardly extending curtain of fibers when the polymers are extruded through the spinneret.

The line 10 further includes a quenching gas outlet 20 adjacently positioned to the curtain of fibers 16 extending from the spinneret 18, and the gas from the outlet 20 at least partially quenches, i.e., the polymer forming the fibers is no longer able to freely flow, and develops a latent helical crimp in the extending fibers 18. As an example, an air stream of a temperature between about 45° F. and about 90° F. which is directed substantially perpendicular to the length of the fibers at a velocity from about 100 to about 400 feet minute can be effectively used as a quenching gas. Although the quenching process is illustrated with a one-outlet quenching system, more than one quenching gas outlets can be utilized.

A fiber draw unit or an aspirator 22 is positioned below the quenching gas outlet and receives the quenched fibers. Fiber draw units or aspirators for use in melt spinning polymers are well known in the art, and exemplary fiber draw units suitable for the present invention include a linear fiber aspirator of the type shown in U.S. Pat. No. 3,802,817 to Matsuki et al. and eductive guns of the type shown in U.S. Pat. No. 3,692,618 to Dorshner et al. and U.S. Pat. No. 3,423,266 to Davies et al.

The fiber draw unit 22, in general, has an elongated passage through which the fibers are drawn by aspirating gas. The aspirating gas may be any gas, such as air, that does not adversely interact with the polymer of the fibers. In accordance with the present invention, the aspirating gas is heated using, for example, a temperature adjustable heater 24. The heated aspirating gas draws the quenched fibers and heats the fibers to a temperature that is required to activate the latent crimps thereon. The temperature required to activate the latent crimp on the fibers ranges from about 110° F. to a maximum of less than the melting point of the low melting component polymer. Generally, a higher air temperature produces a higher number of crimps. One of the important advantages of the present fiber web forming process is that the crimp density, i.e., the number of crimps per unit length of a fiber, of the fibers and thus the density and pore size distribution of the resulting webs can be controlled by controlling the temperature of the aspirating gas, providing a convenient way to engineer nonwoven webs to accommodate different needs of different filter applications. Additionally, the crimp density can be controlled to some degree by regulating the amount of potential latent crimps that can be heat activated, and the amount of potential latent crimps can be controlled by varying the spinning conditions, such as melt temperature and aspirating gas velocity. For example, higher amounts of potential latent crimps can be imparted on polyethylene/polypropylene bicomponent fibers by supplying lower velocities of aspirating gas.

The drawn crimped fibers are then deposited onto a continuous forming surface 26 in a random manner. The fiber depositing process preferably is assisted by a vacuum device 30 placed underneath the forming surface. The vacuum force largely eliminates the undesirable scattering of the fibers and guides the fibers onto the forming surface to form a uniform unbonded web of continuous fibers. The resulting web can be lightly compressed by a compression roller 32, if a light compaction of the web is desired to provide enhanced integrity to the unbonded web before the web is subjected to a bonding process.

The unbonded web is then bonded in a bonder, such as a through-air bonder 36, to provide coherency and physical strength. The use of a through-air bonder is particularly useful for the present invention in that the bonder produces a highly bonded nonwoven web without applying significant compacting pressure. In the through-air bonder 36, a flow of heated air is applied through the web, e.g., from a hood 40 to a perforated roller 38, to heat the web to a temperature above the melting point of the low melting component polymer but below the melting point of the high melting component polymer. The bonding process may be assisted by a vacuum device that is placed underneath the perforated roller 38. Upon heating, the low melting polymer portions of the web fibers are melted and the melted portions of the fibers adhere to adjacent fibers at the cross-over points while the high melting polymer portions of the fibers tend to maintain the physical and dimensional integrity of the web. As such, the through-air bonding process turns the unbonded web into a cohesive nonwoven fiber web without significantly changing its originally engineered web dimensions, density, porosity and crimp density.

The bonding air temperature may vary widely to accommodate different melting points of different component polymers and to accommodate the temperature and speed limitations of different bonders. In addition, basis weight of the web must be considered in choosing the air temperature. It is to be noted that the duration of the bonding process should not be too long as to induce significant shrinkage of the web. As an example, when polypropylene and polyethylene are used as the component polymers for a conjugate-fiber web, the air flowing through the through-air bonder may have a temperature between about 230° F. and about 280° F. and a velocity from about 100 to about 500 feet per minute.

The filter medium produced in accordance with the present invention is a lofty, low density medium that can retain a large quantity of contaminants without impeding the filtrate flow or causing a high pressure drop across the filter medium. The highly porous, three-dimensional loft of the present filter medium promotes the mechanical entrapment of contaminants within its intersticial spaces, while providing alternate channels for the filtrate to flow through. In addition, the filter medium may contain a density gradient of fibers across its depth, adding to the advantages of the present filter medium. As stated above, a fiber density gradient in filter media improves the filter efficiency and service life.

Figure 2:
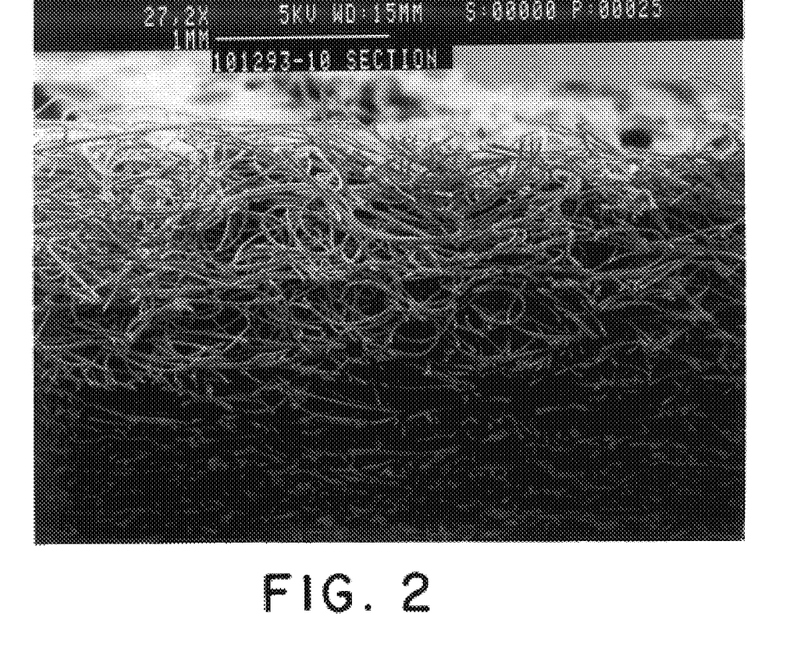
FIGS. 2 and 3 are about 27 and 22 times enlarged photomicrographs, respectively, of two exemplary bicomponent spunbond filter media.
Figure 3:
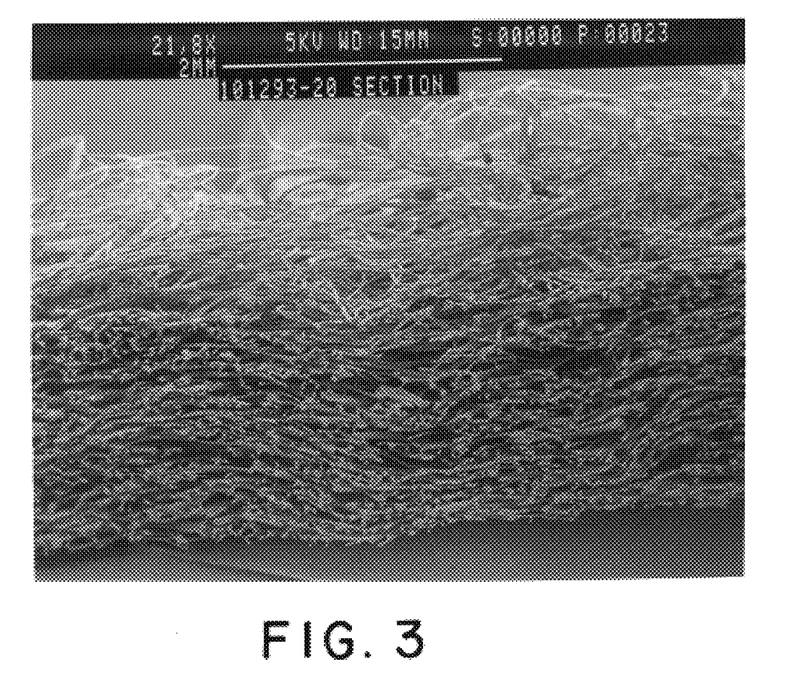

The above-described through-air bonding process is the highly suitable bonding process that can be used not only to effect high strength interfiber bonds without significantly compacting the webs, but also to impart a density gradient across the depth of the webs. The density gradient imparted filter media that are produced with the through-air bonding process have the highest fiber density at the region where the fibers contacts the web supporting surface, e.g., the perforated roller 33. Although it is not wished to be bound by any theory, it is believed that during the through-air bonding process, the fibers across the depth of the web toward the web supporting surface are subjected to increasing compacting pressures of the web's own weight and of the flows of the assist vacuum and the bonding air, and, thus, the fiber density gradient is imparted in the resulting web when proper settings in the bonder are employed. Turning to FIGS. 2 and 3, the figures are scanning electron microphotographs of fiber gradient imparted bicomponent spunbond filter media produced and bonded in accordance with the above-described spunbond web-forming process and through-air bonding process. The filter media of FIGS. 2 and 3 and the processes used to produce the same are further described below in Examples 3 and 7, respectively. As can be seen from the figures, the filter media have increasing fiber gradient densities in the direction of the depth.

Alternatively, a filter medium containing a fiber density gradient can be produced by laminating two or more layers of filter media having different fiber densities. Such component filter media of different fiber densities can be prepared, for example, by imparting different levels of crimps on the fibers or utilizing fibers of different crimp levels and/or different sizes. More conveniently, if a spunbond process is used to produced the present filter medium, a fiber density gradient can be imparted by sequentially spinning fibers of different crimp levels and/or different fiber sizes and sequentially depositing the fibers onto a forming surface.

Even though the particularly suitable bonding processes for the present invention are through-air bonding processes, the unbonded web can be bonded, for example, with the use of adhesives, e.g., applying a powder adhesive or spraying a liquid adhesive, while preserving the lofty structure of the present nonwoven web. Optionally, when a filter application requires different properties, such as a high tear or burst strength, from the filter media, other bonding processes, including point-bonding, ultrasonic bonding and hydroentangling processes, may be employed in addition to a low-compacting bonding process, e.g., through-air bonding process, to impart added cohesion and strength to the nonwoven web.

In addition to the filter media formed from continuous multicomponent conjugate spunbond fibers, useful nonwoven filter media can also be formed from conjugate staple fibers, monocomponent staple fibers and monocomponent spunbond fibers, provided that they are crimped fibers.

The web forming processes using conjugate staple fibers, monocomponent staple fibers and monocomponent spunbond fibers are, however, somewhat disadvantageous in that these processes require additional manufacturing steps. For example, processes for forming conjugate staple fiber webs require additional steps such as staple fiber forming and fiber carding steps and may require separate crimping steps; processes for forming monocomponent staple fiber webs may require additional mechanical crimping steps and adhesive applying and curing steps; and processes for forming monocomponent spunbond fiber webs may require adhesive applying and curing steps. In addition, these web forming processes are not as flexible as the conjugate spunbond fiber web forming process of the present invention, which permits on-line adjustments of the fiber crimp level and on-line formation of the density gradient. Consequently, the spunbond conjugate fiber web forming process, which is a highly adjustable and flexible process, is the particularly advantageous process for economically producing the lofty filter media. Furthermore, the spunbond conjugate filter media produced from the process can be engineered to provide and to emphasize different filtration properties required for different applications. The lofty spunbond conjugate filter media exhibit a desired high physical strength, which is attributable to the spunbond fiber strength, as well as can be made to have different porosity and density levels to accommodate different filtration needs.

The present nonwoven filter media may contain other fibers, including natural fibers, e.g., cotton fibers and wood pulps, and staple or continuous synthetic fibers; and additives, including activated carbon, odor absorbents, surfactants, stabilizers and the like. Natural and staple fibers and particulate or fluid additives can be added to the nonwoven web by, for example, blowing the fibers or additives into the curtain of drawn fibers exiting the draw unit. Continuous synthetic fibers may be added to the filter web, for example, by simultaneously spinning different polymer melts through some of the spinholes of the bicomponent spinneret assembly, e.g., monocomponent fibers are co-spun with bicomponent fibers, or by co-drawing separately spun monocomponent and bicomponent fibers in one drawing unit.

The present filter media are suitable for fluid-borne particle filtration applications, such as filtration media for transmission fluids, hydraulic fluids, swimming pool water, coolant oil or cutting fluid for metalworking, metal forming and metal rolling, air-borne particle filtration and the like since the filter media provide high filtration efficiency, extended service life and excellent physical properties. The lofty filter media are highly suitable for liquid filtration applications. While the compacting pressure of liquid filtrate quickly accumulates contaminants and plugs up the available pores of conventional filter media fabricated from low loft media, such as uncrimped spunbond fiber or staple fiber media, the liquid compacting pressure does not as quickly affect the present lofty filter media, especially the media containing a fiber density gradient, since the lofty, gradient-imparted structure of the present filter media entraps a large amount of contaminants within the intersticial spaces without plugging up all of the intersticial flow paths. Examples of suitable liquid applications include filter media for cutting fluids and coolants of metal machining and rolling machines.

Additionally, the present lofty filter media can be used in conjunction with specialized filtration media, such as filter media that have an ultra-high filter efficiency but a limited service life, to take advantage of the beneficial properties of the two media, providing a combination filter assembly of high efficiency and long service life. Such combination filter media may be formed, for example, by laminating the present lofty filter medium with a micro filter medium, e.g., a membrane filter, meltblown fiber web filter or wet-laid fiber filter.

The following examples are provided to illustrate the present invention and are not intended to limit the scope of the present invention thereto.

EXAMPLES

Examples 1–7 (Ex.1–Ex.7)

A linear low density polyethylene, Aspun 6811A, which is available from Dow Chemical, was blended with 2 wt % of a $TiO_2$ concentrate containing 50 wt % of $TiO_2$ and 50 wt % of a polypropylene, and the mixture was fed into a first single screw extruder. A polypropylene, PD3443, which is available from Exxon, was blended with 2 wt % of the above-described $TiO_2$ concentrate, and the mixture was fed into a second single screw extruder. The extruded polymers were spun into round bicomponent fibers having a side-by-side configuration and a 1:1 weight ratio of the two polymers using a bicomponent spinning die, which had a 0.6 mm spinhole diameter and a 6:1 L/D ratio. The melt temperatures of the polymers fed into the spinning die were kept at 450° F., and the spinhole throughput rate was 0.5 gram/hole/minute. The bicomponent fibers exiting the spinning die was quenched by a flow of air having a flow rate of 45 SCFM/inch spinneret width and a temperature of 65° F. The quenching air was applied about 5 inches below the spinneret, and the quenched fibers were drawn in an aspirating unit which is described in U.S. Pat. No. 3,802,817 to Matsuki et al. The aspirator was equipped with a temperature controlled aspirating air source, and the feed air temperature was kept at about 350° F. The fibers for each test specimen entering the aspirator was drawn with the heated feed air at a flow rate as indicated in Table 1.

TABLE 1

| Example | Air Flow Rate (ft³/min/in withdth) | Residence Time (seconds) |
| --- | --- | --- |
| Ex.1 | 19 | 2 |
| Ex.2 | 19 | 4 |
| Ex.3 | 23 | 2 |
| Ex.4 | 24 | 2 |
| Ex.5 | 25 | 2 |
| Ex.6 | 25 | 2 |
| Ex.7 | 25 | 4 |

The-drawn fibers were deposited on a foraminous forming surface with the assist of a vacuum flow to form unbonded fiber webs. The unbonded fiber webs were bonded by passing the webs through a through-air bonder having an air temperature of 272° F. and a air velocity of 200 feet/min. The residence time for each web specimen in the bonder was as indicated in Table 1.

Comparative Examples 1–5 (C1–C5)

Comparative Examples 1–3 were Reemay™ filters, which are commercially available from Reemay, Inc., Old Hickory, Tenn., and Comparative Example 4 was Manniweb™ 5163, which is commercially available from Lydall Manning Inc., Troy, N.Y. Reemay filters are calender bonded polyethylene terephthalate spunbond fiber webs, and Maniweb 5136 is a wetlaid web of polyethylene terephthalate fibers. Comparative Example 5 was a point bonded polypropylene spunbond fiber web which is commercially available from Kimberly-Clark under the tradename Accord™.

Testing Procedure

The efficiency and service life of the filter samples were tested as follows. The filter testing apparatus had a 90 mm diameter filter holder assembly, which has an inlet and an outlet and directs the influent fluid entering from the inlet to pass through the sample filter medium, a gear pump, which supplies the influent fluid to the filter holder assembly and is capable of maintaining two gallons per minute per square inch flow rate, and a pressure gauge, which is placed on the inlet side of the filter holder assembly. Samples of filter media were prepared by cutting filter webs to fit a 90 mm diameter filter holder. Each filter medium was weighed and fitted in the filter holder assembly. A test fluid, which contains 3 vol % of QP 24 soap/oil emulsion and 93 vol % water, was placed in a beaker and then 800 mg of an AC fine test particles was added to the test fluid. The test particles had the following particle size distributions:

| Size (less than) | Volume % |
| --- | --- |
| 5.5 μm | 38 |
| 11 μm | 54 |
| 22 μm | 71 |
| 44 μm | 89 |
| 176 μm | 100. |

The test fluid was continuously stirred with a magnetic stirrer. The inlet of the pump was placed in the beaker, and the testing fluid was pumped through the sample filter and then returned to the beaker, forming a continuous loop. The initial pressure and time were noted. 800 mg of the test particles was added to the beaker at an interval of 5 minutes until the inlet pressure reached 30 psi, at which time the filter medium was considered plugged.

The plugged time was noted and the filter medium was removed. The removed filter medium was weighed to determine the amount of the test particles captured after completely drying it in an oven set at 180° F. The efficiency of the filter medium was determined by dividing the weight of the captured test particles by the weight of the total test particles added to the beaker.

The Frazier porosity was determined utilizing a Frazier Air Permeability tester available from the Frazier Precision Instrument Company and measured in accordance with Federal Test Method 5450, Standard No. 191A, and the density was calculated from the caliper of each test specimen, which was measured at 0.5 psi with a Starret-type bulk tester. The mean flow pores size (MFP), which is a measure of average pore diameter as determined by a liquid displacement techniques utilizing a Coulter Porometer and Coulter Profil™ test liquid available from Coulter Electronics Ltd., Luton, England, was determined by wetting the test sample with a liquid having a very low surface tension (i.e., Coulter Profil™). Air pressure was applied to one side of the sample, and as the air pressure is increased, the capillary attraction of the fluid in the largest pores is overcome, forcing the liquid out and allowing air to pass through the sample. With further increases in the air pressure, progressively smaller and smaller holes will clear. A flow versus pressure relationship for the wet sample was established and compared to the results of the dry sample. The MFP was measured at the point where the curve representing 50% of the dry sample flow versus pressure intersects the curve representing wet sample flow versus pressure. The diameter of the pore which opens at that particular pressure (i.e., the MFP) was determined from the following expression: Pore Diameter $(\mu m)=(40\tau)$/pressure, wherein $\tau$=surface tension of the fluid expressed in units of mN/M; the pressure is the applied pressure expressed in milibars; and the very low surface tension of the liquid used to wet the sample allows one to assume that the contact angle of the liquid on the sample is about zero.

The test results are shown in Table 2.

for fluid-borne particle filtration applications, such as filtration media for transmission fluids, hydraulic fluids, swimming pool water, coolant oil or cutting fluid for metalworking, metal forming and metal rolling, air-borne particle filtration and the like.

What is claimed is:

1. A lofty nonwoven filter medium comprising a nonwoven fiber web adapted for filtering fluid-borne particles, said nonwoven medium filter having a depth and comprising an uncompacted, autogenously bonded web of crimped continuous multicomponent spunbond fibers wherein said nonwoven filter medium has a density greater than 0.005 g/cm$^3$ and less than 0.1 g/cm$^3$ and a density gradient across its depth and further wherein said spunbond fibers have an average diameter of from about 10 $\mu$m to about 50 $\mu$m.

2. The filter medium of claim 1 wherein said nonwoven filter is further adapted for filtering fluid-borne particles by having a density gradient across its depth comprised at least in part by upper and lower portions of said filter medium having different crimp levels.

3. The filter medium of claim 1 wherein said filter medium has a density between 0.03 g/cm$^3$ and 0.09 g/cm$^3$.

4. The filter medium of claims 1 wherein said multicomponent fibers comprise a polyolefin and polyester.

5. The filter medium of claims 1 wherein said multicomponent fibers comprise a polyolefin and a polyamide.

6. The filter medium of claim 1 wherein said multicomponent fibers comprise polyethylene and polypropylene.

7. A method of filtering fluid-borne particles, comprising:
flowing a fluid containing fluid-borne particles through a nonwoven web having a basis weight between about 0.25 ounces per square yard and about 15 ounces per square yard, said nonwoven web having a depth and comprising a fiber web of crimped continuous multicomponent spunbond fibers wherein said nonwoven web has a density between about 0.005 g/cm$^3$ and about 0.1 g/cm$^3$, has a fiber density gradient across its depth

TABLE 2

| SAMPLES | WEIGHT (osy) | MFP ($\mu$m) | DENIER | POROSITY (Frazier, CFM) | DENSITY (g/cc) | % EFFICIENCY | PLUG TIME (Min) |
|---|---|---|---|---|---|---|---|
| Ex. 1 | 3.0 | | 2.1 | 365 | 0.03 | 33.20 | 55.25 |
| EX. 2 | 6.0 | | 2.2 | 190 | 0.03 | 42.39 | 119.34 |
| Ex. 3 | 3.0 | 60.32 | 2.2 | 237.6 | 0.054 | 41.30 | 46.47 |
| Ex. 4 | 3.0 | 55.71 | 2.2 | 242.0 | 0.069 | 42.8 | 31.25 |
| Ex. 5 | 3.0 | 54.56 | 2.1 | 195.2 | 0.075 | 32.8 | 16 |
| Ex. 6 | 3.0 | 54.56 | 2.1 | 195.2 | 0.075 | 39.43 | 11.87 |
| Ex. 7 | 6.0 | 49.95 | | 104.0 | 0.075 | 40.16 | 15.86 |
| C1 | 2.0 | | | | 0.22 | 24.77 | 11.06 |
| C2 | 3.0 | 40.72 | 3.1 | 172.4 | 0.22 | 30 | 5.86 |
| C3 | 5.0 | | | | | 53.05 | 4.77 |
| C4 | 3.5 | | | | 0.13 | 53.44 | 2.71 |
| C5 | 2.5 | | 2.6 | 135 | 0.15 | 36.07 | 5.53 |

As can be seen from the results, the bicomponent fiber filter media of the present invention have significantly lower densities than the commercially available filter media, such as conventional spunbond fiber filter media, and provide significantly improved service life performances as well as high filter efficiencies.

The present lofty filter media, which provide extended service lives and high filter efficiencies, are highly suitable and said spunbond fibers have an average diameter less than about 50 $\mu$m and wherein fluid-borne particles are entrapped within said nonwoven web.

8. The method of claim 7 wherein said fluid comprises a liquid.

9. The method of claim 8 wherein said liquid comprises an aqueous solution.

10. The method of claim 8 wherein said crimped multicomponent spunbond fibers are bicomponent fibers.

11. The method of claim 7 wherein said fluid comprises a gas.

12. The method of claim 11 wherein said multicomponent spunbond fibers are bicomponent fibers.

13. The method of claim 7 wherein said multicomponent fibers comprise at least two component polymers having different melting points, wherein said component polymers include a highest melting point polymer and a lowest melting point polymer.

14. The method of claim 13 wherein said multicomponent fibers are through-air bonded at a temperature equal to or higher than the melting point of the lowest melting component polymer but lower than the melting point of the highest melting component polymer.

15. The method of claim 14 wherein said multicomponent spunbond fibers have an average fiber diameter between about 10 μm and about 50 μm.

16. The method of claim 13 wherein said multicomponent spunbond fibers comprise at least two different polymers selected from the group consisting of polyolefins, polyamides, polyesters, polycarbonates, polystyrenes, and blends and copolymers thereof.

17. The method of claim 16 wherein said multicomponent spunbond fibers comprise a polyolefin and a polyester.

18. The method of claim 16 wherein said multicomponent spunbond fibers comprise a polyolefin and a polyamide.

19. The method of claim 16 wherein said multicomponent spunbond fibers comprise polyethylene and polypropylene.

20. The method of claim 13 wherein said multicomponent spunbond fibers comprise linear low density polyethylene and polypropylene.

21. The method of claim 13 wherein said multicomponent spunbond fibers comprise two different polymers selected from the group consisting of polyolefins.

* * * * *